United States Patent [19]

Tiefenthaler

[11] Patent Number: 4,697,619

[45] Date of Patent: Oct. 6, 1987

[54] SOLENOID VALVE HAVING A POWER AMPLIFIER

[75] Inventor: Edelbert Tiefenthaler, Elgg, Switzerland

[73] Assignee: Sulzer Brothers Limited, Winterthur, Switzerland

[21] Appl. No.: 830,512

[22] Filed: Feb. 14, 1986

Related U.S. Application Data

[63] Continuation of Ser. No. 482,989, Apr. 7, 1983, abandoned.

[30] Foreign Application Priority Data

Apr. 7, 1982 [CH] Switzerland .......................... 2147/82

[51] Int. Cl.$^4$ ............................................. F16K 31/02
[52] U.S. Cl. .................................. 137/613; 251/30.01; 251/30.02; 251/282
[58] Field of Search ...................... 137/613; 251/30.01, 251/30.02, 282

[56] References Cited

U.S. PATENT DOCUMENTS

| | | | |
|---|---|---|---|
| 2,408,708 | 10/1946 | Tweedle | 251/28 |
| 2,496,553 | 2/1950 | Littlefield | 137/595 |
| 2,644,662 | 7/1953 | Powers | 137/613 |
| 2,693,930 | 11/1954 | Carter | 251/30.01 |
| 2,805,038 | 9/1957 | Towler et al. | 137/613 |
| 3,633,620 | 1/1972 | Scott | 137/613 |
| 4,044,794 | 8/1977 | Matthews | 137/613 |
| 4,450,863 | 5/1984 | Brown | 137/613 |

FOREIGN PATENT DOCUMENTS

| | | | |
|---|---|---|---|
| 2492042 | 4/1982 | France | 137/613 |
| 0070727 | 5/1982 | Japan | 137/613 |
| 1040261 | 9/1983 | U.S.S.R. | 137/613 |

Primary Examiner—Samuel Scott
Assistant Examiner—H. A. Odar
Attorney, Agent, or Firm—Kenyon & Kenyon

[57] ABSTRACT

The solenoid valve actuates a pilot valve body which cooperates with a stationary seat surface. The pilot valve body actuates a main valve body of an on-off valve having a piston with a calibrated leakage. The cylindrical chamber on one side of the piston communicates with the inflow side of the on-off valve when the solenoid valve is opened via the pilot valve body, and the cylinder chamber on the other side of the piston communicates directly with a discharge. That side of the piston which is near the main valve body is isolated from the flow path of the on-off valve. The possibility of leakage is reduced considerably for a very reduced constructional outlay, electricity consumption is low and the loss of valve-time cross-section associated with an opening instruction is reduced.

4 Claims, 5 Drawing Figures

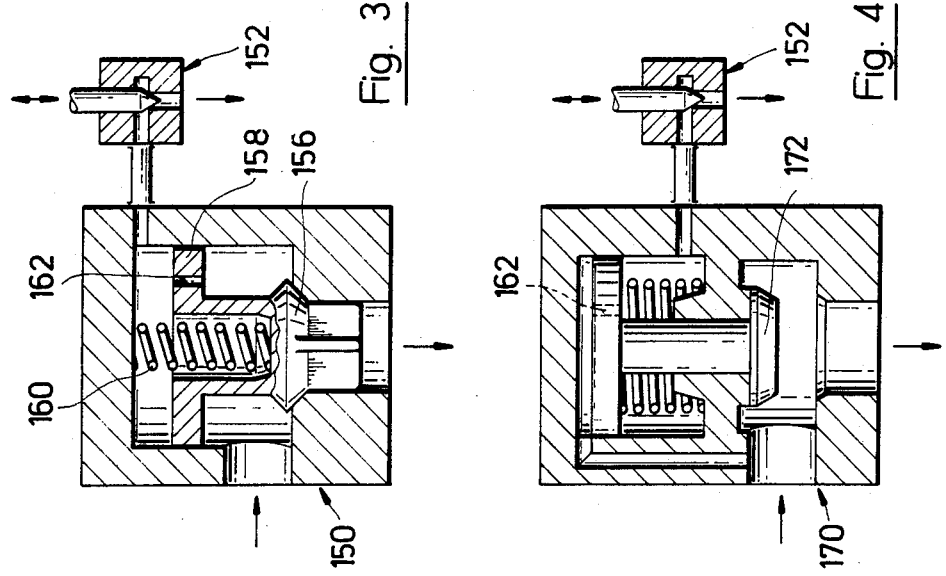
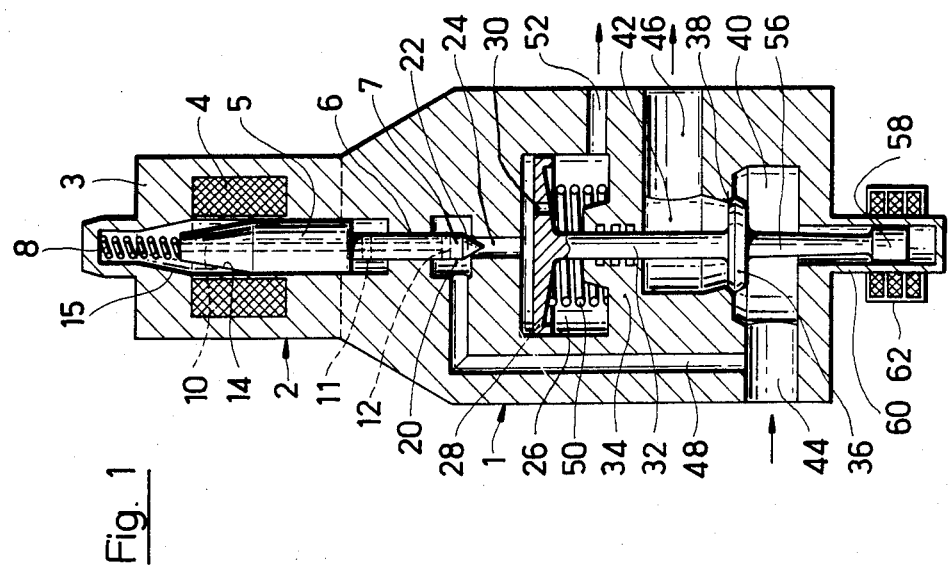

SOLENOID VALVE HAVING A POWER AMPLIFIER

This is a continuation application Ser. No. 482,989 filed Apr. 7, 1983, now abandoned.

This invention relates to a solenoid valve having a power amplifier.

Heretofore, solenoid valves have been known which are constructed with power amplifiers in order to act as an on-off main valve in a flow path of invariable flow direction. For example, it has been known to construct the solenoid valve with a pilot valve body which is seated on a valve seat surface leading to a chamber housing a calibrated-leak piston as well as with an electromagnet for moving the pilot valve body from the valve seat in order to permit a part flow from the flow path to leave from the chamber housing the calibrated-leak piston and thus cause an opening of the main valve. However, a relatively large part of the device experiences an internal pressure
with the main valve body in a closed position. As a consequence, the valve requires increased constructional expenditure in order to obviate leakages. Further, a relatively substantial amount of electrical power is needed to insure an abrupt opening of a predetermined valve cross-section of the main valve.

German GM No. 1,880,539 describes a similar valve combination of a solenoid valve with a power amplifier. This valve combination is constructed to reduce the force requirement for initiating the movements of the main valve body. For this purpose, an additional auxiliary valve is arranged in the main valve body. Further, this additional auxiliary valve is actuated, across an axial bore in the main valve body by a rod which is connected with the piston of the pilot valve and which is biased against the auxiliary valve under spring pressure. However, when such a valve combination is used in connection with a vapor insolation valve in a nuclear reactor installation, regulatory authorities require that a redundant arrangement be made in such a way that a function test can be performed at any time at every power amplifier without appreciably affecting the pressure of the medium upstream of the redundant arrangement.

German O.S. No. 3029394 describes a valve arrangement with two power amplifiers connected in series, each with a solenoid valve. However, in this arangement, the two main valve bodies do not open counter to the flow direction. Further, each contains an additional auxiliary valve designed as a two-way or three-way valve which cooperates with the armature of the associate solenoid valve. Due to the fact that the main valve bodies open in the flow direction, with the opening of the proceding main valve body, the following main valve body must also be unintentionally opened. This is due to the influence of the pressure surge of the pressure medium advancing toward the following main valve body, which surge occurs with the opening of the proceding main valve body. Such a behavior cannot be tolerated by the regulatory authorities. Further, the following main valve body can be tested for performance only if the proceding main valve body is opened or if outside medium is being used.

Accordingly, it is an object of the invention to provide a solenoid valve which is substantially leak proof.

It is another object of the invention to provide a solenoid valve of relatively simple construction which can respond to an opening instruction with very little loss of valve time cross-section.

It is another object of the invention to provide a solenoid valve which can be operated with a minimum of electrical power.

Briefly, the invention is directed to a valve having a pair of solenoid vavles mounted in a casing block in parallel relative to a flow of medium. Further, each solenoid valve includes
a pilot valve body, a valve seat and an electro-magnet for moving the pilot valve body from an extended position to a retracted position (or vice versa relative to the value seat), In addition, each solenoid valve cooperates with a power amplifier having an inlet to receive a flow of medium, an outlet to deliver the flow of medium and a main valve body for sealing the inlet from the outlet. Each power amplifier also has a cylindrical chamber disposed in sealed relation to the outlet and a calibrated-leak piston reciprocally mounted in the cylindrical chamber and connected to the main valve body. Each chamber also communicates with a valve seat surface receives a pilot valve body.

The solenoid valves are connected in a redundant manner such that it is possible to test each main valve body independently of the other to test for functionality. If, for example, the solenoid valve of the preceding power amplifier is opened, pressure medium passes from the inlet of this power amplifier to the associated piston which then moves the associated main valve body in an opening direction. The pressure medium thus reaching the inlet of the second power amplifier cannot flow farther than to the second main valve body because this valve body is in a closed position and, moreover, is pressurized in the closing direction. Thus, leaking pressure medium cannot pass from the second power amplifier to the outlet thereof. With the solenoid valve of the preceding power amplifier closed, if the solenoid valve of the following power amplifier is opened, the piston of this following power amplifier is pressurized by pressure medium from the inlet of the preceding power amplifier and the main valve body of the following power amplifier is opened. However, no pressure medium would pass from the preceding power amplifier to the following power amplifier because the main valve body of the preceding power amplifier remains closed and is also pressurized in the closing direction.

These and other objects and advantages of the invention will become more apparent from the following detailed description taken in conjunction with the accompanying drawings wherein:

FIG. 1 illustrates a diagrammatic axial sectional view through a solenoid valve having a power amplifier in accordance with the invention.

FIG. 3 diagrammatically illustrates a safety valve and a connected solenoid valve in accordance with a prior art;

FIG. 4 illustrates a further diagrammatic view of a steam isolating valve and a solenoid valve
in accordance with a prior art; and.

Figure 5:
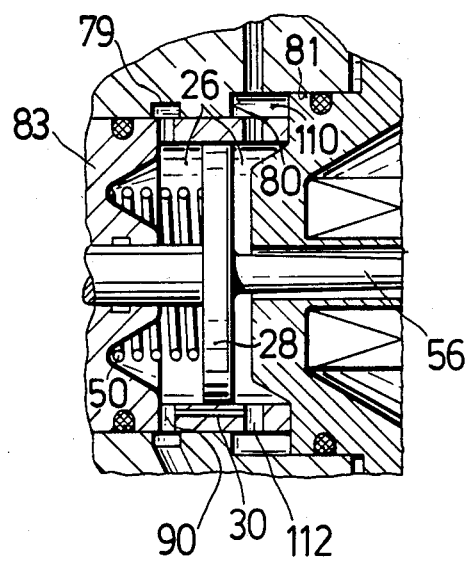

FIG. 5 illustrates an enlarged part view of a valve employing a calibrated bore in a wall surrounding a piston in accordance with the invention.

Referring to FIG. 1, the solenoid valve 2 includes a stator 3 within which a winding 4 of an electro-magnet is mounted along with an armature 5 which is mounted for movement axially of the stator 3. As indicated, a compression spring 8 is disposed within the stator 3 to bias the armature 5 to an extended position as shown. The armature 5 also carries a spindle 6 to which a pilot valve body 7 is connected.

The armature 5 and spindle 6 are each formed with a longitudinal bore 10 while the spindle 6 is further provided with two cross bores 11, 12 for pressure equalization. As indicated, the armature 5 is provided with a conical surface 14 at the upper end which is disposed opposite to an inner conical surface 15 on the stator 3. The axial gap formed between the two surfaces 14, 15 determines the operative movement of the pilot valve body 7 and the electrical consumption of the winding 4. For the sake of clarity, the gap is shown greatly exaggerated in size.

The solenoid valve also includes a power amplifier 1 which contains a housing or chamber 20 receiving the pilot valve body 7 of the spindle 6. As indicated, the chamber 20 has a valve seat surface 22 for sealingly receiving the pilot valve body 7. This valve seat surface 22 terminates at one end of a bore 24 which extends to a cylindrical chamber 26 in which a piston 28 is reciprocally mounted. This piston 28 is of the calibrated-leak type and, to this end, has a calibrated bore 30 which communicates opposite sides of the piston with each other.

The piston 28 is connected via a valve spindle 32 which extends through a wall 34 to a main valve body 36. A sealing surface of the main valve body 36 cooperates with a valve seat 38 which forms a boundary between an entry chamber 40 and an exit chamber 42 of the main valve. In addition, an inlet 44 for receiving a flow of medium extends into the entry chamber 40 while an outlet 46 for delivering the flow of medium extends from the exit chamber 42.

In addition, a means in the form of an angled duct 48 extends from the inlet 44 to the chamber 20 in order to communicate the inlet 44 with the valve seat surface 22 and the cylindrical chamber on the upper side of the piston 28. Means in the form of a relief bore 52 communicates the cylindrical chamber 26 on the opposite side of the piston 28 with a discharge line (not shown).

As shown, a spring 50 is provided between the piston 28 and the wall 34 within the cylindrical chamber 26 for biasing the piston 28 in its upper position. This serves to move the main valve body 36 into a position sealing the inlet 44 from the outlet 46, as viewed. Of note, the wall 34 thickens in the fashion of a hub near the valve spindle 32 so as to form a longitudinal guide for the spindle 32.

Further, a rod 56 continues the valve spindle 32 beyond the main valve body 36 and carries a ferromagnetic cylindrical core 58. This core 58 extends into a blind sleeve 60 which is made of an austenitic material and on which a detector winding 62 is disposed.

The solenoid valve operates as follows.

In a normal state, that is with the valve 2 dropped (i.e. with the winding 4 de-energized) the pilot valve body 7 and main valve body 36 are in the illustrated closed state. This state or position is indicated by means of the detector winding 62 as an operative movement of zero.

In the closed state, both valve bodies 7, 36 are acted on by a pressure medium, such as hot water, which is supplied through the inlet bore 44 and is under pressure. Downstream of the main valve body 36, the exit chamber 42 and outlet 46 are usually depressurized. However, there may also be pressure at these points. The part of the cylinder chamber 26 which is closest the main valve body 36 is also depressurized by way of the relief bore 52 while the part of the cylinder chamber 26 on the other side of the piston 28 is relieved of pressure via the bore 30 in the piston 28 and the relief bore 52.

The main valve body 36 is kept closed by the spring 50 and, as a rule, by a pressure difference acting upon the valve body 36. Further, given an appropriate physical arrangement, the weight of the unit comprising the piston 28, spindle 32, valve body 36, rod 56 and core 58 may also be used to keep the valve body 36 in a closed position.

When the winding 4 is abruptly energized and the valve 2 picks up, the valve body 7 disengages abruptly from the seat 22. The medium acting in the chamber 20 then shoots into the cylinder 26 via the bore 24. Since the cross-section of the calibrated bore 30 together with a leakage cross-section at the periphery of the piston 28 is considerably smaller than the cross-section opened by the pilot valve body 7, a pressure builds up rapidly in the cylinder 26 above the piston 28, as viewed.

The medium flowing through and around the piston 28 into the lower part of the cylinder chamber 26 flows out of the relief bore 52 and builds up substantially no pressure.

The piston 28 is so large relative to the main valve body 36 that the valve body 36 opens very rapidly in response to the pressure difference operative on the piston 28.

If the flowing medium is hot water, that is water of substantially wet steam temperature at a correspondingly high pressure, there may be minor evaporation when the valve body 7 opens because of the pressure drop in the cross-section of the pilot valve. This evaporation in no way impairs the operation of the power amplifier 1. Instead, the pressure acting on the piston 28 upstream of the calibrated bore 30 is reduced less in contrast to previously known solenoid valves with power amplifiers where evaporation delays the opening of the main valve considerably.

One factor which contributes considerably to the rapid opening of the main valve in response to an abrupt energization of the winding 4 is that the side of the piston 28 which is closest the main valve body 36 is separated from the flow path 44, 40, 42, 46 by the wall 34. Hence, the pulse produced by the flow being deflected in the exit chamber 42 cannot act on the piston 28, that is, the pulse cannot impede the opening movement of the valve body 36.

Also, isolating the cylindrical chamber 26 from the exit chamber 42 insures that the flow forces cannot make the unit 28, 32, 36, 56, 58 oscillate with the result of reducing the valve-time cross-section (defined as the time integral of the open valve cross-section). Consequently, the valve-time cross-section follows the time integral of the electrical signal applied to the winding with very reduced delay. In particular, for a short "on", the quotient of the time integral of the valve-time cross-section and the time integral of the electrical power operative in the winding 4 is very substantial. In other words, the main valve obeys an opening instruction with a very reduced loss of valve-time cross-section and with a low consumption of electricity.

Figure 2:
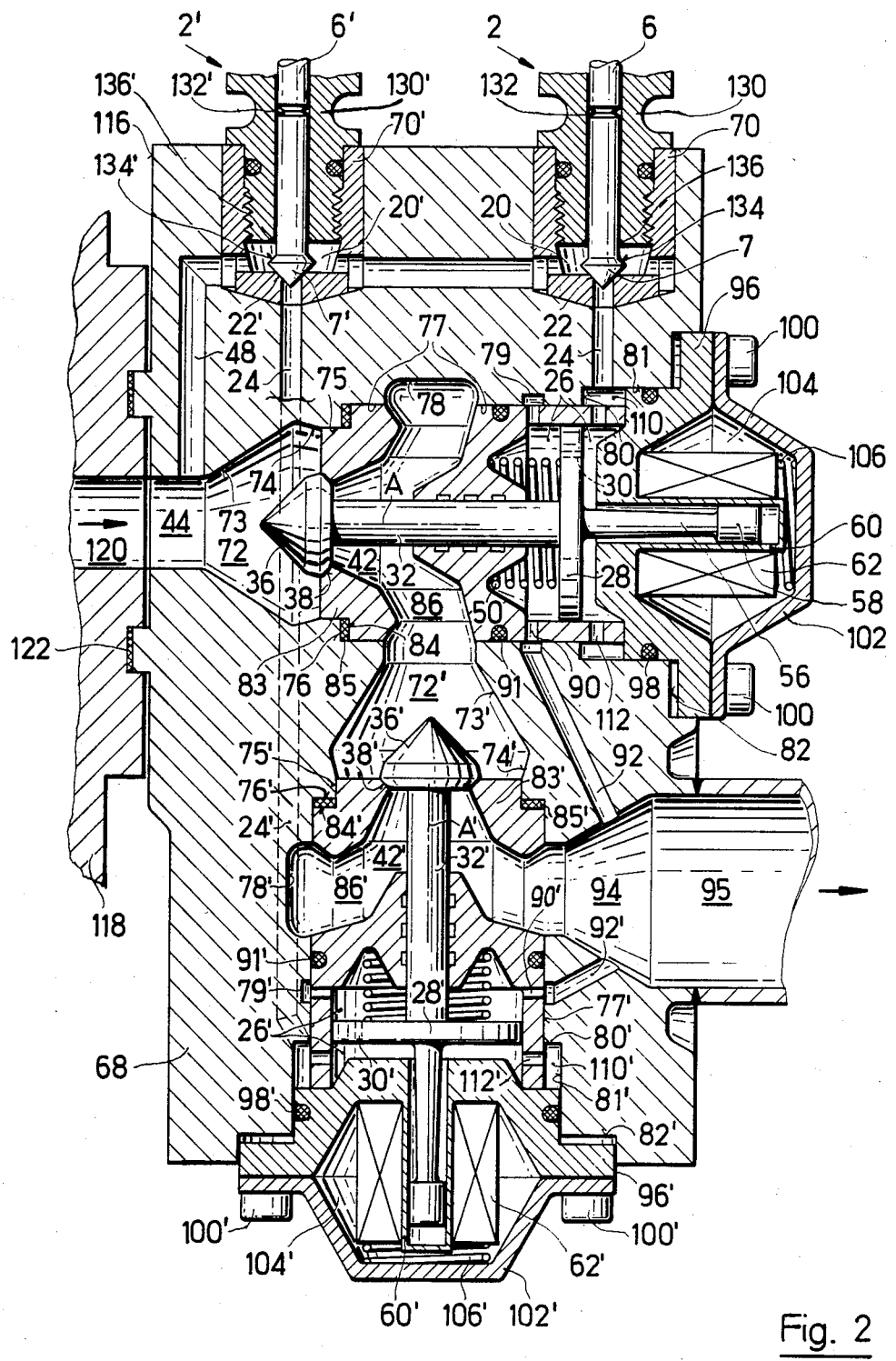
FIG. 2 illustrates a cross-sectional view of a redundant arrangement of two solenoid valves each having a power amplifier in accordance with the invention.

Referring to FIG. 2, a valve may be constructed in a redundant manner. As shown, the valve includes a casing block 68 and a pair of solenoid valves 2, 2' which are mounted in the block 68.

The casing block 68 includes a pair of bores in which inserts 70, 70' are soldered to receive a respective solenoid valve 2, 2'. Each insert 70, 70' has a seat surface 22, 22'.

The casing block 68 also has an inlet 44 for a flow of medium and an outlet 95 for the discharge of the medium. In addition, the casing 68 is provided with two multi-step spaces 72, 72' having axes A, A' which are perpendicular to one another. These spaces 72, 72' include an inner cone 73, 73', an opposite cone 74, 74', a short bore 75, 75', a shoulder 76, 76' and a major bore 77, 77' with a major relief 78, 78' and a minor relief 79, 79'. Merging into each major bore 77, 77' after a shoulder 80, 80' is a widened bore 81, 81' which in turn merges into a shoulder 82, 82'.

An insert 83, 83' is disposed in each major bore 77, 77' which, like the casing of the power amplifier 1, has a cylindrical chamber 26, 26' and an exit chamber 42, 42'. Each insert 83, 83' also has a matching shoulder 84, 84' engaging by way of a seal 85, 85' with the shoulder 76, 76'. Each insert 83, 83' is formed with lantern-like grooves 86, 86' which extend into the exit chamber 42, 42' and connect the same to the annular chamber formed by the major relief 78, 78'. Bores 90, 90' extend from that part of the cylindrical chamber 26, 26' which is near the main valve body 36, 36' to the minor relief 79, 79', the same communicating by way of lines 92, 92' with an exit cone 94 which is followed by the outlet 95 in the form of a discharge line.

A concave cover 96, 96' which engages in the widened bore 81, 81' and is in seal-tight engagement therewith by way of an O-ring 98, 98' is secured by screws 100, 100' near the shoulder 82, 82', the end face of cover 96, 96' pressing on the insert 83, 83', the seal 85, 85' being compressed. The screws 100, 100' also press a convex cover 102, 102' on the flange of the concave cover 96, 96'. A blind sleeve 60, 60' is disposed in the space 104, 104' between the two covers. A detector winding 62, 62' is disposed on the sleeve 60, 60' and, through the agency of a spring 106, 106' bearing on the convex cover 102, 102', is pressed onto the base of the concave cover 96, 96'.

The inlet 44 extends into the inner cone 73, entry to the inner cone 73' being by way of the major relief 78. The duct 48 branches off the entry bore 44 and extends to the chambers 20', 20 of the inserts 70', 70. Connecting bores 24, 24' extend from the seats 22, 22' in the chambers 20, 20' to an annular duct 110, 110' bounded by the concave cover 96, 96', by the widened bore 81, 81' and by the outer cylindrical surface of the insert 83, 83'. Four bores 112, 112' extend from each annular duct 110, 110' and which are distributed over the periphery to lead to that part of the cylindrical chamber 26, 26' which is distal from the main valve body 36, 36'. The valve casing block 68 is so secured by way of one end face 116 by draw-in bolts (not shown), to a steam isolating valve 118 that a relief aperture 120 therein communicates with the inlet 44. The communication zone is sealed off from atmosphere by a ring seal 122.

The device shown in FIG. 2 operates as follows:

In normal operation, wet steam at a pressure of 50 bar is operative in the inner cone 73 by way of the relief orifice 120 and inlet 44. The moving parts of the device are in the position shown and the chambers downstream of the seat surfaces 22, 22' and valve seats 38, 38' are pressureless and, since the entire block 68 is at a temperature of approximately 150° C., are free from water because of evaporation through the discharge line 95. There may be a condensate upstream of the elements 22, 22', 38, 38'.

The valves 2, 2' are currentless in normal operation and the detector windings 62, 62' output a signal corresponding to zero operative movement. When the valve 2 picks up, wet steam flows through bore 24 into that part of the cylindrical chamber 26 which is distal from the main valve body 36, some of any condensate which may be present evaporating because of the expansion. A small amount of the mixture of steam and water flows through the calibrated bore 30 into that part of the cylindrical chamber 26 which is near the main valve body 36, then flows therefrom substantially without resistance through the bore 90 and line 92 to the discharge line 95.

The inflow of the mixture into that part of the cylindrical chamber 26 which is distal from the main valve body 36 increases the pressure considerably in the corresponding zone, the effect being heightened by the evaporation of entrained water. The valve unit 36, 32, 28, 56, 58 with the main valve body 36 is therefore accelerated in the opening direction.

Because of the resulting increase in volume of that part of the cylindrical chamber 26 which is distal from the main valve body 36 there is additional evaporation of any condensate in the corresponding zone, such additional evaporation boosting the pressure. Since the moving unit 36, 32, 28, 56, 58 can be of very lightweight construction, impact damping is usually unnecessary.

The opening movement of the main valve body 36 is indicated by means of the winding 62. As the main valve body 36 opens, medium flows through the inlet 44, exit chamber 42 and lantern-like grooves 86 into the inner cone 73'. When the solenoid valve 2' picks up simultaneously with solenoid valve 2, the main valve body 36' also moves into an open position and the medium flows further through the exit chamber 42' into the discharge line 95, which is of sufficiently large cross-section to obviate the build-up of unwanted backpressure.

The device shown in FIG. 2, is extremely seal tight when the valves 2, 2' are in the de-energized state, for the pilot valve bodies 7, 7' and main valve bodies 36, 36' are ground in sealingly on their seating surfaces, while only the seal 85 and the seals of the solenoid valves experience pressure. The seal 85 can be omitted if the insert 83 is brazed or soldered sealingly into the space 72.

The effect of the device shown in FIG. 2 is that the relief aperture 120 of the steam-isolated valve communicates by way of a large cross-section with the exit line 95 only when both solenoids 2, 2' are opening. If only one solenoid valve opens, the flow cross-section is limited to the sum of the calibrated bore 30 of 30' associated with such solenoid and the peripheral leakage of the associated piston 28 or 28'. If, for instance, the solenoid valve 2 is open, medium flows through the line 24, radial bores 112, calibrated bore 30 and parallel thereto through the inevitable gap at the periphery of the piston 28 into the corresponding part of the chamber 26 and through the bores 90 and the line 92 into the discharge line 95. Parallel to this flow, a minor quantity of medium flows through the clearance in the valve spindle guide from the exit chamber 42, which is open towards the inlet 44, into the chamber 26 on the spring side of the piston 28. A seal 91 prevents steam from flowing from the major relief 78 into the minor relief 79.

If, on the other hand, only the solenoid valve 2' picks up, the main valve body 36 stays seated and there is a leakage flow only by way of the leakage cross-sections in and on the piston 28'. There is no loss along the guide of the valve spindle 32'.

When the plant is cold, the space between the two valve seats 38, and 38' is filled with cold water and the two main valve bodies 36, 36' are in their closed positions because of a closure of the solenoid valves 2, 2'. If the plant is then started, the valve casing block 68 and contents are heated. The trapped water can then escape through the clearance associated with the guide of the valve spindle 32 and in the end evaporate without excessive pressure building up.

Referring to FIG. 2, the solenoid valves 2, 2' are also constructed to permit rupturing under certain conditions. To this end, each solenoid valve 2, 2' has a frangible zone 130, 130' while the spindle 6, 6' has a similar frangible zone 132, 132'. Also, each pilot valve body 7, 7' has a thickened part having a back-seat 134, 134' which co-operates with a narrow conical sealing surface 136, 136' on the end face of the solenoid valve casing. If because of an accident, for instance, the solenoid valve 2' is knocked off, the pilot valve body 7' cannot be ejected but seals off the chamber 20' from the outside. Consequently, there is no risk of loss of the pressure needed to open the main valves.

FIG. 3 shows as a prior art, an own-medium-controlled safety valve 150 actuated by a pilot valve 152 which is controlled by a solenoid (not shown). Instead of the pilot valve 152, which is shown in diagrammatic form, the solenoid valve having a power amplifier for instance, in the embodiments shown in FIGS. 1 and 2, can be used whereby the bore 163 is connected to the inlet 44 of the amplifier. Like the power amplifier, the safety valve 150 has a valve body 156 which is actuated by a piston 158 (or spring 160). The piston 158 is formed with an equalizing bore 162 which corresponds to the calibrated bores 30, 30'. With the pilot valve 152 closed, the equalizing bore 162 equalizes the pressure acting on both sides of the piston 158. Hence, the safety valve 150 is kept closed by the spring 160 and the upstream pressure applied thereto. When the pilot valve 152 opens, the pressure on the upper side of the piston 158 drops and the pressure difference operative across the piston 158 opens the safety valve.

If the redundant system of FIG. 2 is used in connection with the valve 150 of FIG. 3, the calibrated bore 30, 30' must be small enough relative to the equalizing bore 162 to ensure that the leakage at any of the pistons 28, 28' does not, on its own, produce a pressure difference across the piston 158 sufficient to open the safety valve 150.

FIG. 4 shows, like FIG. 3 as a prior art, a steam isolating valve 170 actuated by a pilot valve. Basically, the valve 170 is of similar construction to the power amplifier of FIG. 1 except that the pilot valve 152 does not actuate the valve body 172 in the same sense.

Actuation of the valve 170 is similar to the actuation of the valve 150. What was said about the size of the equalizing bore 162 applies in the present case too. Again, as in the case of FIG. 3, in the case of the construction shown in FIG. 4, the solenoid valve having a power amplifier as above can be used instead of the pilot valve 152, with the advantages previously mentioned.

In the embodiments shown in FIGS. 1 and 2, the calibrated bore 30, 30' is in the piston 28, 28'. Of course, the calibrated bore 30 can instead be disposed in the wall material of the cylinder which extends around the piston, for example as indicated in FIG. 5 wherein like reference characters indicate like parts as above.

The invention includes a solution of the problem wherein the valve spindle which connects the main valve body 36 to the piston 28 extends through the entry chamber 40, so that the cylindrical chamber 26 is disposed, as compared with FIG. 1, on the opposite side of the main valve body 36. This solution has the disadvantage as compared with the embodiments disclosed of needing a continuous minor flow of medium along the valve spindle 32 and through the calibrated bore 30. However, it does have the advantage that the valve spindle overhangs less and therefore tends less to transverse oscillations than in the cases shown in FIGS. 1 and 2.

The invention thus provides a redundant arrangement in which each power amplifier can be tested from time to time and independently of the other for functionality. Further, testing of each power amplifier can be performed without appreciably affecting the pressure medium upstream of the redundant arrangement of the valve.

What is claimed is:

1. A valve comprising
a casing block having an inlet for a flow of medium and an outlet for a discharge of medium;
a pair of solenoid valves mounted in said casing in parallel relative to the flow of medium to said inlet, each said solenoid valve including a valve seat, a pilot valve body seated on said seat and an electromagnet for moving said valve body relative to said seat;
a first power amplifier connected to a first of said solenoid valves, said power amplifier having a space for receiving a flow of medium from said inlet, a main valve body sealing said inlet from said space, a calibrated leak piston connected to said main valve body, a first chamber on a side of said piston remote from said main valve body in communication with said valve seat of said first solenoid valve and a second chamber on a side of said piston near said main valve body in communication with said first chamber through said calibrated leak piston and with said outlet; and
a second power amplifier connected to a second of said solenoid valves, said second power amplifier being connected in series with said first power amplifier and having a second space for receiving a flow of medium from said space of said first power amplifier, a second main valve body sealing said second space from the first space, a second calibrated leak piston connected to said second main valve body, a first chamber on a side of said second piston remote from said second main valve body in communication with said valve seat of said second piston near said second main valve body in communication with said first chamber of said second power amplifier through said second calibrated leak piston and with said outlet.

2. A valve as set forth in claim 1 wherein said first main valve body is movable into said inlet to permit a flow of medium into said space of said first power amplifier and said second main valve body is movable towards said first space to permit a flow of medium therefrom into said second space.

3. A valve comprising a casing block having an inlet for a flow of medium and an outlet for a discharge of medium;

a pair of solenoid valves mounted in said casing block in parallel relative to the flow of medium to said insert, each said solenoid valve including a valve seat, a pilot valve body seated on said seat and an electromagnet for moving said valve body relative to said seat;

a first power amplifier connected to a first of said solenoid valves, said power amplifier having an insert, a space in said insert for receiving a flow of medium from said inlet, a main valve body sealing said inlet from said space, a piston connected to said main valve body and slidably mounted in said insert, a first chamber on a side of said piston remote from said main valve body in communication with said valve seat of said first solenoid valve, a second chamber on a side of said piston near said main valve body in communication with said first chamber and said outlet, and a calibrated bore in said insert connecting said first chamber with said second chamber; and a second power amplifier connected to a second of said solenoid valves, said second power amplifier being connected in series with said first power amplifier and having a second insert, a second space in said second insert for receiving a flow of medium from said space of said first power amplifier, a second main valve body sealing said second space from the first space, a second piston connected to said second main valve body and slidably mounted in said second insert, a first chamber on a side of said second piston remote from said second main valve body in communication with said valve seat of said second solenoid valve, a second chamber on a side of said second piston near said second main valve body in communication with said first chamber of said second power amplifier and said outlet, and a second calibrated bore in said second insert connecting said chambers of said second power amplifier.

4. A valve comprising a casing block having an inlet for a flow of medium and an outlet for a discharge of medium;

a pair of solenoid valves mounted in said casing block in parallel relative to the flow of medium to said inlet, each said solenoid valve including a valve seat, a pilot valve body seated on said seat and an electromagnet for moving said valve body relative to said seat;

a first power amplifier connected to a first of said solenoid valves, said power amplifier having a space for receiving a flow of medium from said inlet, a main valve body sealing said inlet from space, a piston connected to said main valve body, a first chamber on a side of said piston remote from said main valve body in communication with said valve seat of said first solenoid valve, a second chamber on a side of said piston near said main valve body in communication with said outlet, and a calibrated bore in at least one of said piston and an annular wall slidably receiving said piston connecting said first chamber with said second chamber; and a second power amplifier connected to a second of said solenoid valves, said second power amplifier being connected in series with said first power amplifier and having a second space for receiving a flow of medium from said space of said first power amplifier, a second main valve body sealing said second space from the first space, a second piston connected to said second main valve body, a first chamber on a side of said second piston remote from said second main valve body in communication with said valve seat of said second solenoid valve, a second chamber on a side of said second piston near said second main valve body in communication with said outlet, and a second calibrated bore in at least one of said second piston and an annular wall slidably receiving said second piston connecting said chambers of said second power amplifier.

* * * * *

UNITED STATES PATENT AND TRADEMARK OFFICE
CERTIFICATE OF CORRECTION

PATENT NO. : 4,697,619

DATED : October 6, 1987

INVENTOR(S) : EDELBERT TIEFENTHALER

It is certified that error appears in the above-identified patent and that said Letters Patent is hereby corrected as shown below:

```
Column 1, line 5 "continuation" should be -continuation of-
Column 1, line 39 "insolation" should be -isolation-
Column 1, lines 55, 60 and 63 "proceding" should be -preceding-
Column 2, line 7 "vavles" should be -valves-
Column 2, line 12 after "versa" insert -    )-
Column 2, line 13 change "value" to - valve-
Column 2, line 13 change "seat," to -seat.-
Column 2, line 22 before "receives" insert -which-
Column 6, line 53 change "I(f)" to -If-
Column 6, line 55 change "30 of 30'" to -30 or 30'-
```

Signed and Sealed this

Seventeenth Day of May, 1988

Attest:

DONALD J. QUIGG

Attesting Officer

Commissioner of Patents and Trademarks